Patented Nov. 5, 1946

2,410,737

UNITED STATES PATENT OFFICE 2,410,737

METHOD OF CURING HYDROCARBON-SUBSTITUTED POLYSILOXANE RESIN COMPOSITIONS CONTAINING LEAD MONOXIDE

Alfred L. Jenny, Pittsfield, Mass., assignor to General Electric Company, a corporation of New York No Drawing. Application August 11, 1944, Serial No. 549,125

10 Claims. (Cl. 260—37)

The present invention relates to polysiloxane resin compositions, i. e., compositions comprising a resinous condensation product containing a plurality of hydrocarbon-substituted silicon atoms linked by oxygen, the average number of hydrocarbon groups attached to silicon atoms being more than 1 and less than 2 per silicon atom. Examples of resins of this type are described and claimed in Patents 2,258,218–222 of Eugene G. Rochow. They may be prepared by hydrolysis and condensation of a mixture of hydrocarbon-substituted silicon halides (or mixtures of such silicon halides and a silicon tetrahalide) containing the required average number of hydrocarbon groups attached to silicon. The immediate products are soluble liquid resins which require prolonged heating at an elevated temperature to convert them to the solid insoluble state.

The invention is based on the discoverery that when the liquid or soluble polysiloxane resinous compositions are modified by the addition of lead monoxide, the resultant products can be cured at lower temperatures and in shorter periods of time than the same compositions containing no lead monoxide. While the effect of the lead monoxide on the polysiloxane resins is not completely understood, it is known to involve a reaction between the oxide and free hydroxyl groups present in the liquid resin to form Si—O—Pb—O—Si linkages in the resin. For example, the crystalline compound (CH$_3$)$_3$SiO—Pb—OSi(CH$_3$)$_3$ has been prepared from the simple compound trimethyl silicol and lead monoxide. It is believed to include also a catalytic action of the lead monoxide on the final resin condensation reaction resulting in the formation of larger polysiloxane molecules. Of a large number of metal oxides, including the higher oxides of lead, which have been investigated, lead monoxide was the only one which, when added to heat-hardenable polysiloxane resins, had any appreciable effect on the cure of the polysiloxane compositions.

The action of the lead monoxide is quite pronounced, as is shown by the difference in the cure of a modified and unmodified methyl silicone resin obtained by hydrolysis and condensation of a mixture of methyl silicon chlorides and silicon tetrachloride, followed by a refluxing of a toluene solution of the liquid condensation product in the presence of small amounts of antimony pentachloride and ferric chloride hexahydrate in accordance with the process described and claimed in the copending application S. N. 455,615 of James G. E. Wright and James Marsden, filed August 21, 1942, now Patent No. 2,389,477, issued November 20, 1945, and assigned to the same assignee as the present invention. The resinous product, which contained some free hydroxyl groups attached to silicon, had a methyl-to-silicon ratio of about 1.4. Films of the resin cured to a solid, insoluble state when heated for about 10 hours at 300 deg. C.

The addition of from 5 to about 60 parts by weight of litharge to 100 parts of this resin produced a resinous reaction product which cured to the same solid, insoluble state when heated for 3 hours at 200 deg. C. Thus the addition of the lead monoxide effected a reduction in both the curing time and temperature.

Except for the differences in viscosity of the uncured mixtures due to the presence of the solid lead oxide, little or no differences were noted in the physical properties and appearances of the modified resins containing from 5 to 60 per cent lead monoxide. Thick sections of the lead oxide-modified products set to a soft spongy and rubbery state when left at room temperature or at 150 deg. C. for a few hours. A piece of the spongy product obtained at room temperature became quite hard and dense but resilient on heating at 300 deg. C. for 4 hours. The heated piece did not show appreciable change in dimensions when so heated. It was subjected to sufficient pressure to reduce its thickness by ⅓. Upon releasing the pressure, the piece assumed its original thickness. These spongy products may be used as gasket materials for normal and high temperature applications.

Films of the lead monoxide-modified resin are tougher than films of the unmodified resins and may be used as such or on carriers of aluminum foil, glass fiber sheets, paper, etc., as capacitor dielectrics. One sample of modified resin was found to have a dielectric constant at 1480 kilocycles of 7.4 as compared with 3.0–3.5 for the unmodified resin.

The curing effect of lead monoxide on polysiloxane resins is not limited to the specific resin described hereinbefore and the resin need not be subjected to the treatment with metal halides as described in the above-mentioned Wright and Marsden application. Illustrative examples of other polysiloxane resins which may be employed in the practice of the invention are the regular heat-hardenable methyl polysiloxane resins and the ethyl, ethyl phenyl, methyl phenyl, phenyl, tolyl, benzyl, methyl ethyl, etc., polysiloxane resins containing an average of more than 1 and less than 2, preferably from 1.3 to 1.7 Si-hydrocarbon (alkyl, alkaryl, aryl, and aralkyl) groups per silicon atom. The lead oxide is added to the liquid intermediate resinous condensation products containing some uncondensed Si-OH groups.

The preferred proportions of lead monoxide depend on the desired rate of cure and the intended application of the modified resins. Small amounts of litharge, in the neighborhood of about one per cent by weight, will markedly improve the cure of the above-described polysiloxane resins. Larger amounts ranging from a few per cent up to 100 per cent, based on the weight of the resin, can be used to advantage. The excess oxide acts as a filler and improves the strength and dielectric constant of the cured product. The specific capacitance-temperature coefficient of the product also depends on its lead monoxide content, so that within limits any desired coefficient may be obtained by varying the lead monoxide content. For most applications a lead oxide content of from 5 to 80 or 90 per cent is preferred.

In addition to their use as gaskets and dielectric materials, the lead monoxide-modified products may be used with or without fillers or pigments as protective and insulating coatings, in molding compositions, in the manufacture of laminated products, with conductive fillers as bonded resistors or conductive films, etc. Preferred fillers are the simple, double or ternary metal titanates such as the titanates of magnesium, calcium, barium, strontium, lead, vanadium, etc. The normally negative capacitance-temperature coefficient of the lead monoxide-modified resins can be decreased by the addition of magnesium titanate as a filler. For higher dielectric constants, the titanates of barium and strontium are employed as fillers.

What I claim as new and desire to secure by Letters Patent of the United States is:

1. A composition of matter comprising (1) a hydrocarbon-substituted polysiloxane resin, the average number of hydrocarbon groups attached to silicon atoms in said resin being more than 1 and less than 2 per silicon atom, and (2) lead monoxide in an amount corresponding to from about 1 to 100 per cent by weight of the resin of (1).

2. A composition of matter comprising (1) a methyl polysiloxane resin, the average number of methyl groups attached to silicon atoms in said resin being more than 1 and less than 2 per silicon atom, and (2) lead monoxide in an amount corresponding to from about 1 to 100 per cent by weight of the resin of (1).

3. A composition of matter comprising (1) a methyl polysiloxane resin, the average number of methyl groups attached to silicon atoms in said resin being more than 1 and less than 2 per silicon atom, and (2) from about 5 to 90 per cent by weight of lead monoxide based on the resin of (1).

4. A composition of matter comprising a methyl polysiloxane resin containing an average of from 1.3 to 1.7 methyl groups per silicon atom and from about 5 to 90 per cent by weight of lead monoxide based on the weight of the resin.

5. The method which comprises mixing together (1) a liquid hydrocarbon-substituted polysiloxane having an average of more than 1 and less than 2 hydrocarbon groups per silicon atom and (2) lead monoxide in an amount corresponding to from about 1 to 100 per cent by weight of the polysiloxane of (1), and heating the resulting mixture at a temperature and for a period of time sufficient to convert the said polysiloxane to an insoluble solid state.

6. The method of curing a liquid methyl polysiloxane resin in which the average number of methyl groups per silicon atom is more than 1 and less than 2, said method comprising mixing with the said resin from about 1 to 100 per cent by weight thereof of lead monoxide, and heating the resulting mixture at a temperature and for a period of time sufficient to convert the said resin to an insoluble solid state.

7. A composition of matter comprising (1) a hydrocarbon-substituted polysiloxane resin, the average number of hydrocarbon groups attached to silicon atoms in said resin being more than 1 and less than 2 per silicon atom, (2) lead monoxide in an amount corresponding to from about 1 to 100 per cent by weight of the resin of (1), and (3), as a filler for said composition, a titanate selected from the class consisting of the titanates of magnesium, calcium, barium, strontium, lead and vanadium.

8. A composition of matter comprising a methyl polysiloxane resin containing an average of from 1.3 to 1.7 methyl groups per silicon atom, from 5 to 90 per cent by weight of lead monoxide based on the weight of the resin and, as a filler for said composition, barium titanate.

9. A composition of matter comprising a methyl polysiloxane resin containing an average of from 1.3 to 1.7 methyl groups per silicon atom, from 5 to 90 per cent by weight of lead monoxide based on the weight of the resin and, as a filler for said composition, strontium titanate.

10. A composition of matter comprising a methyl polysiloxane resin containing an average of from 1.3 to 1.7 methyl groups per silicon atom, from 5 to 90 per cent by weight of lead monoxide based on the weight of the resin and, as a filler for said composition, magnesium titanate.

ALFRED L. JENNY.